US009093075B2

(12) United States Patent
Alameh et al.

(10) Patent No.: US 9,093,075 B2
(45) Date of Patent: Jul. 28, 2015

(54) RECOGNIZING REPEATED SPEECH IN A MOBILE COMPUTING DEVICE

(75) Inventors: Rachid M Alameh, Crystal Lake, IL (US); Jiri Slaby, Buffalo Grove, IL (US); Hirsashi D Watanabe, Lake Forest, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 464 days.

(21) Appl. No.: 13/452,031

(22) Filed: Apr. 20, 2012

(65) Prior Publication Data

US 2013/0282371 A1    Oct. 24, 2013

(51) Int. Cl.
| | | |
|---|---|---|
| G10L 15/00 | (2013.01) |
| G10L 15/26 | (2006.01) |
| H04L 12/18 | (2006.01) |
| H04M 1/656 | (2006.01) |
| H04M 3/22 | (2006.01) |
| H04M 3/42 | (2006.01) |
| G10L 15/22 | (2006.01) |

(52) U.S. Cl.
CPC .......... *G10L 15/26* (2013.01); *H04L 12/1831* (2013.01); *H04M 1/656* (2013.01); *H04M 3/2281* (2013.01); *H04M 3/42221* (2013.01); *G10L 2015/223* (2013.01); *H04M 2201/40* (2013.01); *H04M 2250/74* (2013.01)

(58) Field of Classification Search
CPC ....... G10L 15/00; G10L 15/22; G10L 15/222; G10L 15/26; G10L 15/28; G10L 2015/00; G10L 2015/06; G10L 2015/22; G10L 2015/221; G10L 2015/223; G10L 2015/225; G10L 2015/228

USPC ......... 704/231, 235, 236, 243, 249, 250, 251, 704/270, 270.1
See application file for complete search history.

(56) References Cited

U.S. PATENT DOCUMENTS

| | | | |
|---|---|---|---|
| 5,737,724 A | | 4/1998 | Atal et al. |
| 5,832,429 A | * | 11/1998 | Gammel et al. .............. 704/255 |
| 6,751,595 B2 | | 6/2004 | Busayapongchai et al. |
| 7,035,800 B2 | | 4/2006 | Tapper |
| 7,400,711 B1 | | 7/2008 | Ford et al. |
| 8,068,814 B2 | | 11/2011 | Celik |

(Continued)

FOREIGN PATENT DOCUMENTS

WO    2011/151502    12/2011

OTHER PUBLICATIONS

Microsoft Exchange, "Voicemail with Unified Messaging in Microsoft Exchange", 2010, 2 pages.

(Continued)

*Primary Examiner* — Qi Han
(74) *Attorney, Agent, or Firm* — Fish & Richardson P.C.

(57) ABSTRACT

A method is disclosed herein for recognizing a repeated utterance in a mobile computing device via a processor. A first utterance is detected being spoken into a first mobile computing device. Likewise, a second utterance is detected being spoken into a second mobile computing device within a predetermined time period. The second utterance substantially matches the first spoken utterance and the first and second mobile computing devices are communicatively coupled to each other. The processor enables capturing, at least temporarily, a matching utterance for performing a subsequent processing function. The performed subsequent processing function is based on a type of captured utterance.

20 Claims, 6 Drawing Sheets

(56) References Cited

U.S. PATENT DOCUMENTS

| | | | |
|---|---|---|---|
| 8,140,330 B2 | 3/2012 | Cevik et al. | |
| 8,428,944 B2 | 4/2013 | Poultney et al. | |
| 2003/0114202 A1* | 6/2003 | Suh et al. | 455/569 |
| 2008/0126100 A1* | 5/2008 | Grost et al. | 704/275 |
| 2009/0060156 A1 | 3/2009 | Burckart et al. | |
| 2009/0234655 A1 | 9/2009 | Kwon | |
| 2009/0275316 A1 | 11/2009 | Springer | |
| 2012/0253802 A1 | 10/2012 | Heck et al. | |

OTHER PUBLICATIONS

International Search Report and Written Opinion in International Application No. PCT/US2013/037285, dated Jul. 23, 2013, 12 pages.

Kitaoka et al., "Detection and Recognition of Correction Utterance in Spontaneously Spoken Dialog," Eurospeech 2003, pp. 625-628.

Vertanen and Kristensson, "Recognition and Correction of Voice Web Search Queries," Interspeech 2009, Sep. 2009, pp. 1863-1866.

Feng and Bangalore, "Query parsing for voice-enabled mobile local search," International Conference on Acoustics, Speech and SIgnal Processing, Apr. 2009, pp. 4777-4780.

Tech talk, "What is Speech Recognition Context?" Aug. 29, 2007, retrieved from the internet: URL<http://speechrecognition.wordpress.com/2007/08/29/what-is-a-speech-recognition-context/>, 2 pages.

International Preliminary Report on Patentability in International Application No. PCT/US2013/037285, dated Oct. 30, 2014, 10 pages.

* cited by examiner

RECOGNIZING REPEATED SPEECH IN A MOBILE COMPUTING DEVICE

FIELD OF THE DISCLOSURE

The present disclosure relates generally to recognizing and analyzing vocal expressions spoken into a mobile computing device and more particularly to monitoring the vocal expressions for matches.

BACKGROUND

Mobile computing devices (sometimes also referred to as mobile communication devices, hereinafter referred to as "device") such as smartphones and tablet computing devices, for example, are equipped with transceivers for communicating utterances (defined herein as vocal expressions of a user of the device) to another user of another device. Much information can be passed between the users of the devices during their conversation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method is disclosed herein for recognizing a repeated utterance in a mobile computing device via a processor. A first utterance is detected being spoken into a first mobile computing device. Likewise, a second utterance is detected being spoken into a second mobile computing device within a predetermined time period. The second utterance substantially matches the first spoken utterance and the first and second mobile computing devices are communicatively coupled to each other. The processor enables capturing, at least temporarily, a matching utterance for a subsequent processing function. The subsequent processing function to be performed is based on a type of captured utterance.

Another method is disclosed herein for recognizing repeated utterance in a mobile computing device via the processor, a transceiver and a user interface. The transceiver includes at least a receiver and may include a transmitter. At least a portion of a first device address is received at the transceiver from a second computing device during a voice-based session between the mobile computing device and the second computing device. At least a portion of a second device address is detected at the user interface directly subsequent to receiving the at least a portion of the first device address from the second computing device. The processor determines that the first and second device addresses substantially match. The substantial match of the first and second device addresses may be captured in memory in response to determining that the first and second device addresses substantially match. A termination of the voice-based session is detected by one of the components of the mobile computing device, such as the transceiver or the processor. A function of the mobile computing device is activated by the processor based on the substantial match of the first and second device addresses in response to detecting the termination of the voice-based session.

Figure 1:
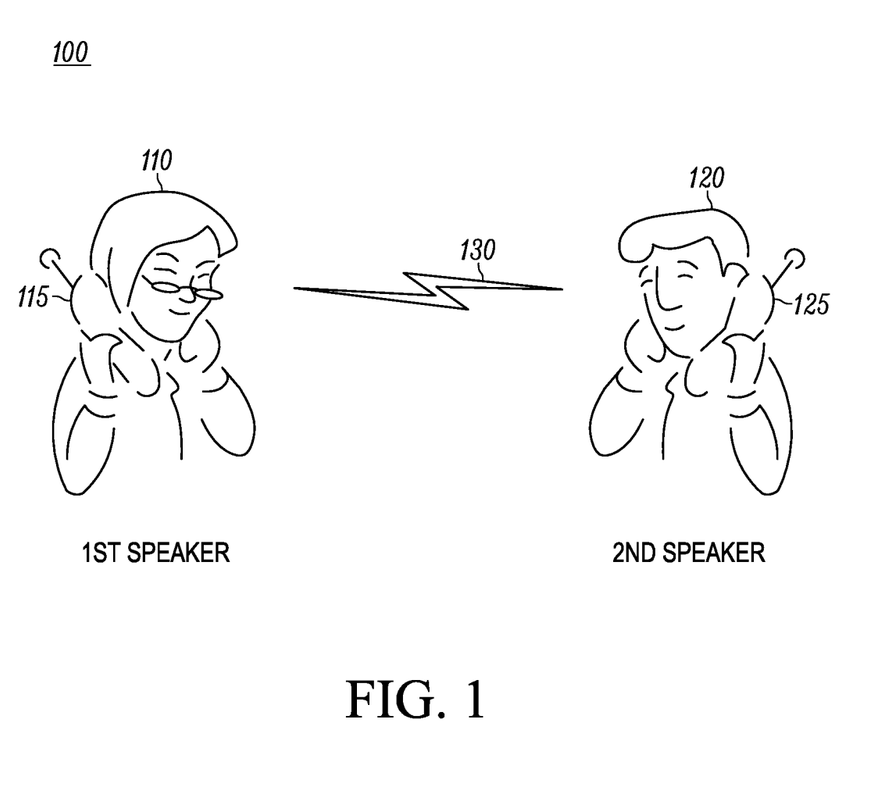
FIG. 1 is an illustration of two speakers using individual mobile computing devices.

FIG. 1 is an illustration 100 showing a first speaker 110 speaking into a mobile computing device 115. The mobile computing device 115 can be a smartphone, a cordless phone, a cellular phone, a tablet computer, a gaming device, a wearable computing device, or a wired phone, for example. FIG. 1 also shows a second speaker 120 speaking into a second mobile computing device 125. It is contemplated that there may be numerous speakers and users of mobile computing devices in a group call. However, for simplicity and clarity two speakers in conversation are described hereafter.

The second mobile computing device 125 can also be a smartphone, a cordless phone, a cellular phone, a tablet computer, a gaming device, a wearable computing device, or a wired phone, for example. Notably, the first and second mobile computing devices need not be alike. First mobile computing device 115 is communicatively coupled to second mobile computing device 125 via a network 130. The network 130 can be a cellular network employing cellular technology such as 2G, 3G, 4G, LTE, and HSPA+, for example. Alternatively, network 130 can be a wireless network employing WiFi technology or a wired network, or a combination of already described network technology employed to provide a communication link.

Figure 2:
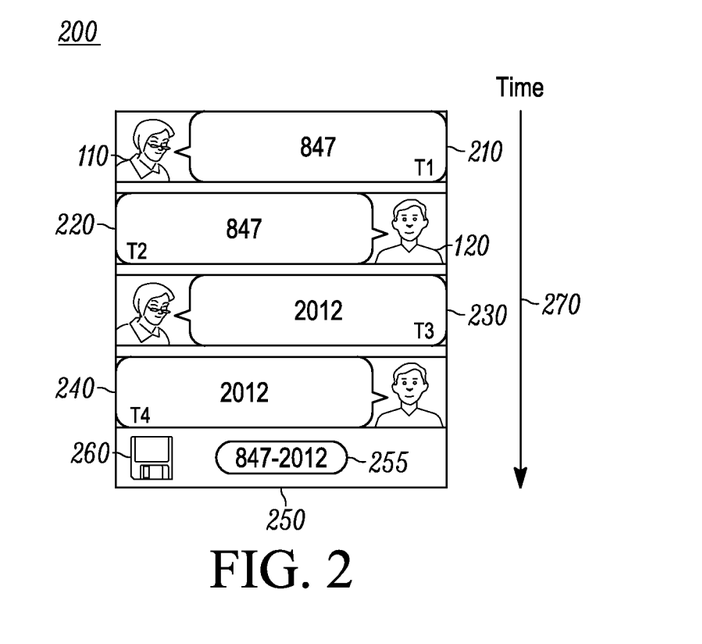
FIG. 2 is an illustration of a short segment of speech passing between the two speakers shown in FIG. 1

First and second speaker 110, 120 engage in a conversation that is analyzed for repeated utterances of the conversation by one of the speakers. FIG. 2 illustrates an example 200 of utterances or speech or vocal expressions exchanged between first speaker 110 and second speaker 120. In one embodiment, first speaker 110 speaks utterance 210 ("847"), while second speaker 120 speaks utterance 220 ("847"). Utterances 210 and 220 match exactly in FIG. 2, hence second speaker 120 repeated first speaker's utterance exactly. The repeated utterance occurs within a predetermined time period 270 to avoid including stray or unrelated conversation or noise as recognized utterances or speech.

Continuing with the conversation shown in FIG. 2, first speaker 110 speaks utterance 230 ("2012"). Second speaker 120 speaks utterance 240 ("2012"), which matches exactly with first speaker's utterance; hence second speaker 120 repeated first speaker's utterance exactly. The matched utterances are combined in a formatted data string 250. The formatted data string 250 can be a telephone number, address, code, a person's name, a business name, a store name, or other characterizing information. The formatted data string 250 can be temporarily stored in a storage location 260. Storage location 260 can be ROM, flashdrive, a cache, a server, a buffer, or other memory device suitable for storing data. Therefore, the matched utterance 255 is at least temporarily stored in storage location 260.

When a matched utterance is determined it can be displayed as written text, animation, or a hyperlink, for example. As such, displayed written text of the matched utterance can be employed as a hyperlink to a website.

Figure 3:
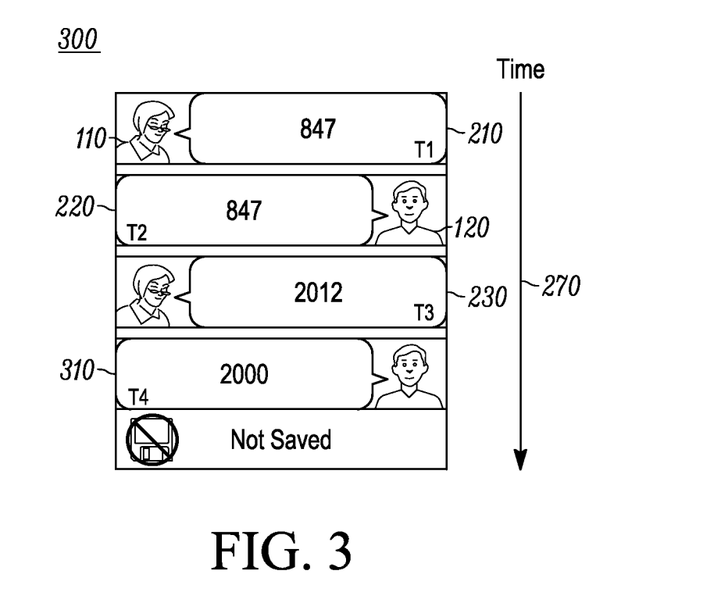
FIG. 3 is another illustration of a different segment of speech passing between the two speakers shown in FIG. 1.

FIG. 3 illustrates an example 300 of unmatched utterances spoken by second speaker 120. Initially, first speaker 110 speaks utterance 210 ("847"), thereafter second speaker 120 speaks utterance 220 ("847"). Utterances 210 and 220 match exactly in FIG. 2, hence second speaker 120 repeated first speaker's utterance exactly. The repeated utterance occurs within a predetermined time period 270. The time period can be in units of seconds or minutes, for example.

Continuing with the conversation shown in FIG. 3, first speaker 110 speaks utterance 230 ("2012"). Second speaker 120, thereafter, speaks utterance 310 ("2000"), which does not match utterance 230 spoken by first speaker 110 in predetermined time period 270. Accordingly, there is no formatted data string formed and no temporary storage of said formatted data string. Additionally, the order of speakers and repeated utterances can be reversed. That is first speaker may repeat second speaker's statement.

The repeated utterances in both FIGS. 2 and 3 are segmented, parsed, partitioned, or separated during the predetermined time period. Hence, their complete meaning is not known immediately. Upon forming a formatted data string from the segmented utterances can one know whether the segmented utterances in their entirety form an address, a telephone number, a banking number, or a retail establishment name, for example.

Figure 4:
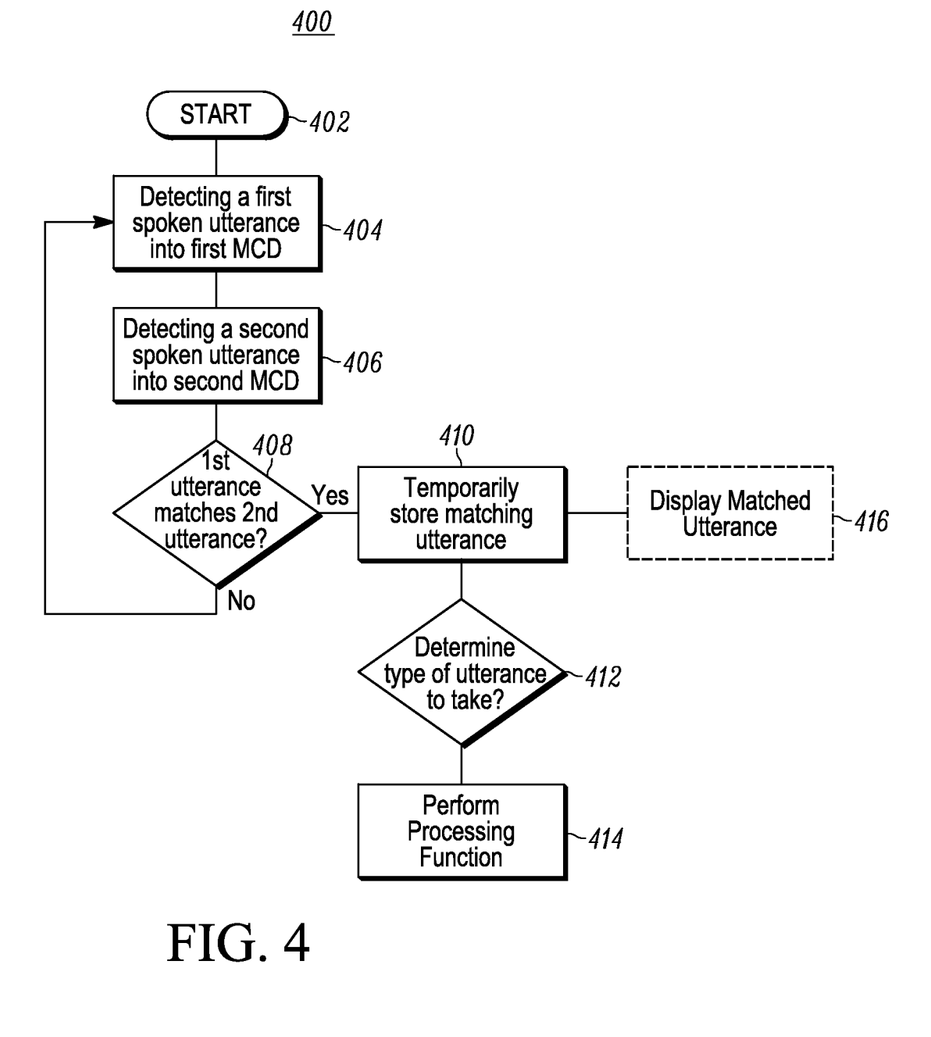
FIG. 4 is an example flowchart for recognizing the segmented speech between speakers.

FIG. 4 shows by way of example, a flowchart 400 useful for implementing one or more embodiments with a processor. Step 402 initializes the process or method. Step 404 detects a first spoken utterance into a first mobile communication device. Step 406 detects a second spoken utterance into a second mobile communication device.

An inquiry is performed by step 408 as to whether the first spoken utterance detected in step 404 matches the second spoken utterance detected in step 406. Should an affirmative match be found, the matching spoken utterance is temporarily stored by step 410. Step 412 determines a particular type of utterance. Subsequent processing functions are performed or initiated by step 414, based on the type of utterance for the mobile communication device. Optionally, step 416 can be employed to display the matching spoken utterance on either the first mobile communication device, or on the second mobile communication device, or on multiple mobile communication devices.

If no matched utterance is found by step 408, then further detection is performed by step 404 on future spoken utterances.

Figure 5:
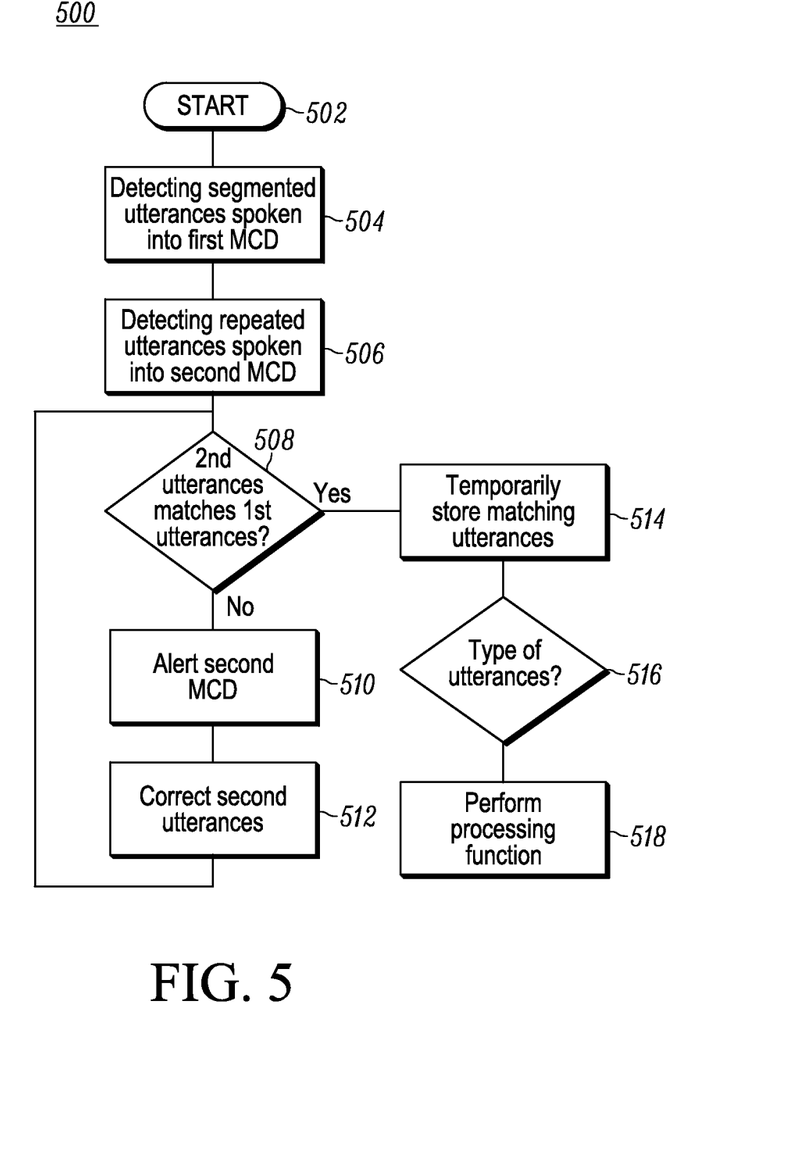
FIG. 5 is another example flowchart for implementing one or more embodiments with a processor.

FIG. 5 shows by way of example, a flowchart 500 useful for implementing one or more embodiments with a processor. Step 502 initializes the process or method. Step 504 detects a plurality of segmented utterances spoken into a first mobile computing device. The plurality of segmented utterances spoken into the first mobile computing device can form a complete message. Step 406 detects whether each repeated utterance segment spoken into a second mobile computing device within a defined time period matches each of the plurality of segmented utterances spoken into the first mobile computing device.

An inquiry is performed by step 508 as to whether the first spoken utterances detected in step 504 matches the second spoken utterances detected in step 506. Step 510 alerts the second mobile computing device when a mismatch of segmented spoken utterances is detected. The alert can include a display of the mismatched utterance, or other visual notifications such as color changes, flags, font changes. In addition, an audible alert can include the mobile computing device speaking the mismatched utterance or usage of another audible signal, including a whistle, a siren, a horn, or any sound that may connote that an error has occurred. Step 512 enables correction of detected mismatched segmented spoken utterances. Optionally, the mobile communication device can be provided with a user feature that allows the user to disable this auto-correcting feature, if the user of the mobile communication device prefers to do so.

The inquiry of step 508 continues until the message formed from the plurality of matched segmented utterances is completely spoken into the second mobile computing device. Should an affirmative match be found, the matching spoken utterances are temporarily stored by step 514. Therefore, a segmented phone number spoken in segmented utterances can be stored as a complete phone number, because it is a complete message. Step 516 determines a particular type of utterance. Subsequent processing functions are performed or initiated by step 518, based on the type of utterance or the type of captured message, for the mobile communication device.

The subsequent processing functions can include, for example, applications or operative functions that launch a displayed map; open a browser window; initialize a banking operation; open a contact or address list; append a photograph or image; provide retail establishment operations information, or initialize a camera sensor. Additional subsequent functions can include a dialing function corresponding to phone numbers; a location search function; an information search function; a music player function; an e-book reader function. One or more filters may be employed to discern certain spoken utterances, for example, a filter for a spoken retail establishment can yield speedy results pertaining to the retail establishment without resorting to looking for information in a contact list or on a website. Likewise, a spoken utterance relating to a music group can be filtered to provide a music anthology about the particular music group.

It should be noted that the first and second device addresses may be a variety of different addresses associated with the devices, such as, but not limited to, phone numbers, messaging addresses (such as email addresses, instant messaging addresses, SMS addresses, and the like), and other identifying addresses of computing devices. It should also be noted that, for some embodiments, a first portion of the second device address may be detected directly subsequent (i.e., with no other voice-based signals therebetween) to a first portion of the first device address being received, and a second portion of the second device address may be detected directly subsequent to a second portion of the first device address being received. For these embodiments, the second portion of the first device address may be received directly subsequent to the first portion of the second device address being detected. In other embodiments, the second device address may detected directly subsequent to receiving the first device address from the second computing device.

Figure 6:
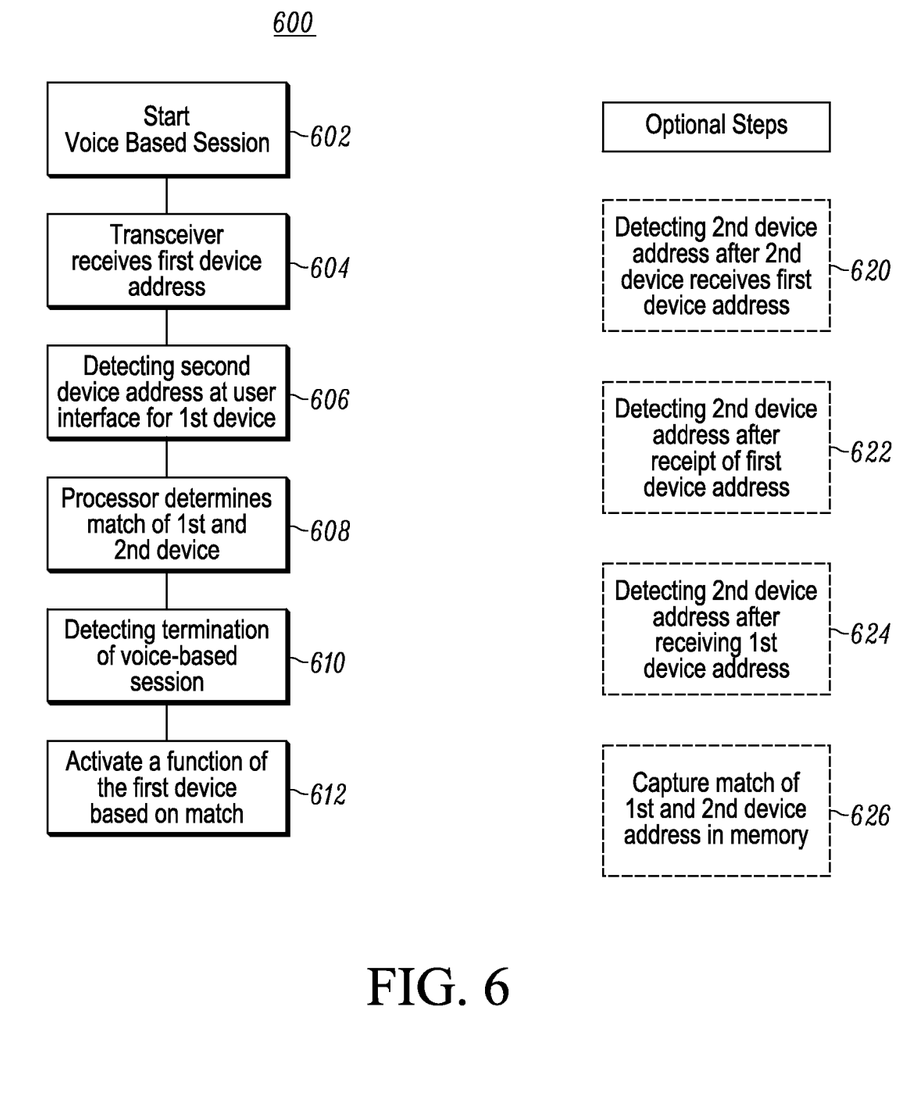
FIG. 6 is yet another example flowchart for recognizing a repeated utterance in a mobile computing device.

FIG. 6 illustrates, by way of example, a flowchart 600 for recognizing a repeated utterance in a mobile computing device. Step 602 initializes a voice-based session. Step 604 directs a transceiver of the mobile computing device to receive at least a portion of a first device's address. Therefore, at least a portion of a first device address can be received from a second device during a voice-based session between the mobile computing device and the second device. The first device address can include a phone number, an email address, a short messaging service (SMS) address, or other messaging addresses such as multi-media messaging service (MMS).

Step 606 of flowchart 600 detects a second device address at a user interface for the first device. The second device address can be in portions and can include a phone number, an email address, a short messaging service (SMS) address, or other messaging addresses such as multi-media messaging service (MMS). Therefore, at least a portion of a second device address is detected directly subsequent to receiving the at least a portion of the first device address from the second device.

Step 608 has a processor, for the mobile computing device, determines whether a match of the first and second device addresses has occurred or exists. In one embodiment, the match of device addresses can be substantially or nearly the same, if not exact. Step 610 detects a termination of the voice-based session.

Subsequently, step 612 activates a function of the first device based on a match of the first device address and the second device address. Additional or optional steps can include steps 620-626. In step 620, the mobile computing device detects the second device address after the second device receives the first device address from the mobile computing device. Therefore, at least a first portion of the second device address is detected directly subsequent to receiving a first portion of the first device address.

In step 622, the mobile computing device detects the second device address after the mobile computing device receives the first device address. Therefore, at least a second portion of the second device address is detected directly subsequent to receiving a second portion of the first device address.

In step 624, the mobile computing device detects the second device address after receiving the first device address from the second device. Accordingly, when at least a portion of a second device address is detected directly subsequent to receiving the at least a portion of the first device address, then the second device address is detected directly subsequent to receiving the first device address from the second device.

Step 626 captures, in a memory location, the matching device address of the first and second devices. Therefore, the substantial match of the first and second device addresses are captured in memory in response to determining that the first and second device addresses substantially match.

Figure 7:
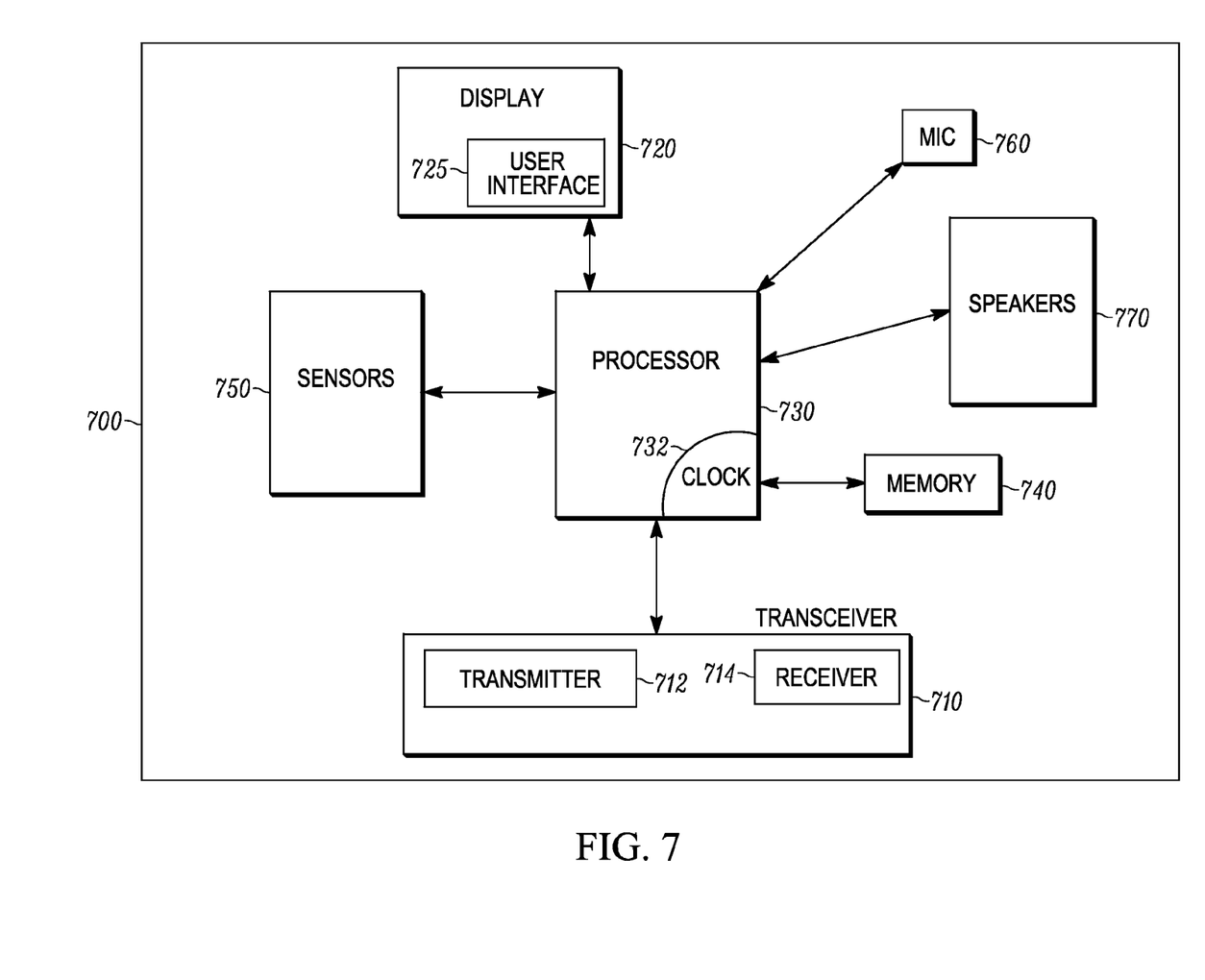
FIG. 7 is an example block diagram of a mobile computing device.

FIG. 7 shows an example block diagram of a mobile computing device 700. Mobile computing device 700 includes a transceiver 710 further comprising a transmitter 712 and receiver 714 for transmitting and receiving electrical and communication signals over a network. Mobile computing device 700 also includes a display 720 further comprising a user interface 725 for displaying useful information to a user of the mobile communication device 700 and enabling the user to input data. A processor 730 interprets, directs, and analyzes for the mobile communication device 700. The processor 730 is configured to run or operate any of the disclosed methods herein. The processor 730 is communicatively coupled to a memory location 740, one or more sensors 750, a microphone 760, and one or more audio speakers 770. Additionally, processor 730 is communicatively coupled to display 720 and transceiver 710, and may include a clock 732. Clock 732 enables processor 730 to perform several steps in a timely manner and also enables processor 730 to track the occurrence of events related to time.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Likewise, computer-readable storage medium can comprise a non-transitory machine readable storage device, having stored thereon a computer program that include a plurality of code sections for performing operations, steps or a set of instructions.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A computer-implemented method comprising:
   obtaining, by a first device, a first transcription of a first utterance that is spoken into the first device by a first user;
   obtaining, by the first device and from a second device, a second transcription of a second utterance that is spoken into the second device by a second user;
   determining, by a first application executing on the first device, that (i) the first transcription exactly matches the second transcription, and (ii) the second utterance was spoken within a predetermined period of time after the first utterance was spoken; and
   based on determining, by the first application executing on the first device, that (i) the first transcription exactly matches the second transcription and (ii) the second utterance was spoken within the predetermined period of time after the first utterance was spoken, providing, by the first device, the first transcription as an input string to a second application.

2. The method of claim 1, wherein the second application is a telephone application, a mapping application, or a search application.

3. The method of claim 2, comprising:
   determining, by the first application executing on the first device, that the first transcription corresponds to an input string format for the telephone application or the mapping application,
   wherein providing, by the first device, the first transcription as the input string to the second application is further based on determining, by the first application executing on the first device, that the first transcription corresponds to the input string format for the telephone application or the mapping application.

4. The method of claim 1, comprising:
   determining, by the first device, that the first user and the second user are engaged in a telephone conversation using the first device and the second device,
   wherein providing, by the first device, the first transcription as the input string to the second application is further based on determining, by the first device, that the first user and the second user are engaged in the telephone conversation using the first device and the second device.

5. The method of claim 1, comprising:
   based at least in part on determining, by the first application executing on the first device, that (i) the first transcription exactly matches the second transcription and (ii) the second utterance was spoken within a predetermined period of time after the first utterance was spoken, providing, to the second device and by the first device, data for displaying a selectable representation of the first transcription, wherein a selection of the selectable representation provides a request to the second device to execute the second application with the input string.

6. The method of claim 1, comprising:
   obtaining, by the first device, a third transcription of a third utterance that is spoken into the first device by the first user;
   obtaining, by the first device, a fourth transcription of a fourth utterance that is spoken into the second device by the second user;
   determining, by the first application executing on the first device, that (i) the third transcription exactly matches the fourth transcription, (ii) the fourth utterance was spoken within the predetermined period of time after the third utterance was spoken, and (iii) the third utterance was spoken within a second predetermined period of time after the second utterance was spoken; and
   based at least in part on determining, by the first application executing on the first device, that (i) the third transcription exactly matches the fourth transcription, (ii) the fourth utterance was spoken within the predetermined period of time after the third utterance was spoken, and (iii) the third utterance was spoken within the second predetermined period of time after the second utterance was spoken, providing, by the first device, the first transcription and the third transcription as a second input string to the second application.

7. The method of claim 1, comprising:
   obtaining, by the first device, a third transcription of a third utterance that is spoken into the first device by the first user;
   obtaining, by the first device, a fourth transcription of a fourth utterance that is spoken into the second device by the second user;
   determining, by the first application executing on the first device, that (i) the third transcription does not match the fourth transcription, (ii) the fourth utterance was spoken within the predetermined period of time after the third utterance was spoken, and (iii) the third utterance was spoken within a second predetermined period of time after the second utterance was spoken; and
   based at least in part on determining, by the first application executing on the first device, that that (i) the first transcription exactly matches the second transcription and (ii) the second utterance was spoken within the predetermined period of time after the first utterance was spoken, (iii) the third transcription does not match the fourth transcription, (iv) the fourth utterance was spoken within the predetermined period of time after the third utterance was spoken, and (v) the third utterance was spoken within the second predetermined period of time after the second utterance was spoken, providing, to the second device and by the first device, data for displaying a representation of the third transcription and the fourth transcription.

8. The method of claim 7, wherein the representation is a selectable representation that when selected provides a request to the second device to request a correction from the second user.

9. A system comprising:
one or more computers and one or more storage devices storing instructions that are operable, when executed by the one or more computers, to cause the one or more computers to perform operations comprising:
obtaining, by a first device, a first transcription of a first utterance that is spoken into the first device by a first user;
obtaining, by the first device and from a second device, a second transcription of a second utterance that is spoken into the second device by a second user;
determining, by a first application executing on the first device, that (i) the first transcription exactly matches the second transcription, and (ii) the second utterance was spoken within a predetermined period of time after the first utterance was spoken; and
based on determining, by the first application executing on the first device, that (i) the first transcription exactly matches the second transcription and (ii) the second utterance was spoken within the predetermined period of time after the first utterance was spoken, providing, by the first device, the first transcription as an input string to a second application.

10. The system of claim 9, wherein the second application is a telephone application, a mapping application, or a search application.

11. The system of claim 10, wherein the operations further comprise:
determining, by the first application executing on the first device, that the first transcription corresponds to an input string format for the telephone application or the mapping application,
wherein providing, by the first device, the first transcription as the input string to the second application is further based on determining, by the first application executing on the first device, that the first transcription corresponds to the input string format for the telephone application or the mapping application.

12. The system of claim 9, wherein the operations further comprise:
determining, by the first device, that the first user and the second user are engaged in a telephone conversation using the first device and the second device,
wherein providing, by the first device, the first transcription as the input string to the second application is further based on determining, by the first device, that the first user and the second user are engaged in the telephone conversation using the first device and the second device.

13. The system of claim 9, wherein the operations further comprise:
based at least in part on determining, by the first application executing on the first device, that (i) the first transcription exactly matches the second transcription and (ii) the second utterance was spoken within a predetermined period of time after the first utterance was spoken, providing, to the second device and by the first device, data for displaying a selectable representation of the first transcription, wherein a selection of the selectable representation provides a request to the second device to execute the second application with the input string.

14. The system of claim 9, wherein the operations further comprise:
obtaining, by the first device, a third transcription of a third utterance that is spoken into the first device by the first user;
obtaining, by the first device, a fourth transcription of a fourth utterance that is spoken into the second device by the second user;
determining, by the first application executing on the first device, that (i) the third transcription exactly matches the fourth transcription, (ii) the fourth utterance was spoken within the predetermined period of time after the third utterance was spoken, and (iii) the third utterance was spoken within a second predetermined period of time after the second utterance was spoken; and
based at least in part on determining, by the first application executing on the first device, that (i) the third transcription exactly matches the fourth transcription, (ii) the fourth utterance was spoken within the predetermined period of time after the third utterance was spoken, and (iii) the third utterance was spoken within the second predetermined period of time after the second utterance was spoken, providing, by the first device, the first transcription and the third transcription as a second input string to the second application.

15. The system of claim 9, wherein the operations further comprise:
obtaining, by the first device, a third transcription of a third utterance that is spoken into the first device by the first user;
obtaining, by the first device, a fourth transcription of a fourth utterance that is spoken into the second device by the second user;
determining, by the first application executing on the first device, that (i) the third transcription does not match the fourth transcription, (ii) the fourth utterance was spoken within the predetermined period of time after the third utterance was spoken, and (iii) the third utterance was spoken within a second predetermined period of time after the second utterance was spoken; and
based at least in part on determining, by the first application executing on the first device, that that (i) the first transcription exactly matches the second transcription and (ii) the second utterance was spoken within the predetermined period of time after the first utterance was spoken, (iii) the third transcription does not match the fourth transcription, (iv) the fourth utterance was spoken within the predetermined period of time after the third utterance was spoken, and (v) the third utterance was spoken within the second predetermined period of time after the second utterance was spoken, providing, to the second device and by the first device, data for displaying a representation of the third transcription and the fourth transcription.

16. The system of claim 15, wherein the representation is a selectable representation that when selected provides a request to the second device to request a correction from the second user.

17. A non-transitory computer-readable medium storing software comprising instructions executable by one or more computers which, upon such execution, cause the one or more computers to perform operations comprising:

obtaining, by a first device, a first transcription of a first utterance that is spoken into the first device by a first user;

obtaining, by the first device and from a second device, a second transcription of a second utterance that is spoken into the second device by a second user;

determining, by a first application executing on the first device, that (i) the first transcription exactly matches the second transcription, and (ii) the second utterance was spoken within a predetermined period of time after the first utterance was spoken; and based on determining, by the first application executing on the first device, that (i) the first transcription exactly matches the second transcription and (ii) the second utterance was spoken within the predetermined period of time after the first utterance was spoken, providing, by the first device, the first transcription as an input string to a second application.

18. The medium of claim 17, wherein the operations further comprise:

determining, by the first device, that the first user and the second user are engaged in a telephone conversation using the first device and the second device, wherein providing, by the first device, the first transcription as the input string to the second application is further based on determining, by the first device, that the first user and the second user are engaged in the telephone conversation using the first device and the second device.

19. The medium of claim 17, wherein the operations further comprise:

based at least in part on determining, by the first application executing on the first device, that (i) the first transcription exactly matches the second transcription and (ii) the second utterance was spoken within a predetermined period of time after the first utterance was spoken, providing, to the second device and by the first device, data for displaying a selectable representation of the first transcription, wherein a selection of the selectable representation provides a request to the second device to execute the second application with the input string.

20. The medium of claim 17, wherein the operations further comprise:

obtaining, by the first device, a third transcription of a third utterance that is spoken into the first device by the first user;

obtaining, by the first device, a fourth transcription of a fourth utterance that is spoken into the second device by the second user;

determining, by the first application executing on the first device, that (i) the third transcription exactly matches the fourth transcription, (ii) the fourth utterance was spoken within the predetermined period of time after the third utterance was spoken, and (iii) the third utterance was spoken within a second predetermined period of time after the second utterance was spoken; and based at least in part on determining, by the first application executing on the first device, that (i) the third transcription exactly matches the fourth transcription, (ii) the fourth utterance was spoken within the predetermined period of time after the third utterance was spoken, and (iii) the third utterance was spoken within the second predetermined period of time after the second utterance was spoken, providing, by the first device, the first transcription and the third transcription as a second input string to the second application.

\* \* \* \* \*